United States Patent
Blaisdell et al.

(10) Patent No.: US 11,837,372 B2
(45) Date of Patent: Dec. 5, 2023

(54) METHODS FOR PROTECTION OF NUCLEAR REACTORS FROM THERMAL HYDRAULIC/NEUTRONIC CORE INSTABILITY

(71) Applicant: Westinghouse Electric Company LLC, Cranberry Township, PA (US)

(72) Inventors: John A. Blaisdell, Suffield, CT (US);
Edward M. Chu, San Jose, CA (US);
Camilla S. Rotander, Enkoping (SE);
Gurikar V. Kumar, San Jose, CA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 17/134,983

(22) Filed: Dec. 28, 2020

(65) Prior Publication Data

US 2021/0225538 A1   Jul. 22, 2021

Related U.S. Application Data

(63) Continuation of application No. 13/798,418, filed on Mar. 13, 2013, now abandoned.
(Continued)

(51) Int. Cl.
*G21D 3/00*  (2006.01)
*G21C 17/112*  (2006.01)
*G21D 3/04*  (2006.01)

(52) U.S. Cl.
CPC .......... *G21D 3/001* (2013.01); *G21C 17/112* (2013.01); *G21D 3/04* (2013.01); *G21D 3/005* (2019.01); *Y02E 30/30* (2013.01)

(58) Field of Classification Search
CPC ........... G21D 3/001; G21D 3/04; G21D 3/005
See application file for complete search history.

(56) References Cited

U.S. PATENT DOCUMENTS

| | | |
|---|---|---|
| 5,091,139 A | 2/1992 | Chao et al. |
| 5,141,710 A | 8/1992 | Stirn et al. |

(Continued)

FOREIGN PATENT DOCUMENTS

| | | |
|---|---|---|
| EP | 2826040 B1 | 3/2018 |
| JP | S6140591 A | 2/1986 |

(Continued)

OTHER PUBLICATIONS

GESTAR. General Electric Standard Application for Reactor Fuel. NEDO-24011-A-16-US. Oct. 2007. See pertinent pages in attached excerpt. <https://www.nrc.gov/docs/ML0913/ML091340080.pdf>. (Year: 2007).*

(Continued)

*Primary Examiner* — Lily C Garner
(74) *Attorney, Agent, or Firm* — K&L Gates LLP

(57) ABSTRACT

The invention relates to methods for protecting a nuclear reactor core, such as a boiling water reactor core, from fuel and cladding damage due to thermal hydraulic instability in extended operating power flow conditions and, in particular, when an extended power uprate is implemented. The methods employ existing licensed stability methodologies and incorporated minor changes, e.g., to the Average Power Range Monitor (APRM)-based trip system to preclude operation inside the stability vulnerable region of the power/flow map. The APRM-based trip system is modified to set down the APRM flow-biased scram line when core flow is less than a predetermined core flow to prevent the core from entering an unstable region of operation.

4 Claims, 3 Drawing Sheets

Related U.S. Application Data

(60) Provisional application No. 61/611,618, filed on Mar. 16, 2012.

(56) References Cited

U.S. PATENT DOCUMENTS

| | | | | |
|---|---|---|---|---|
| 5,174,946 | A | * | 12/1992 | Watford ................. G21D 3/001 376/217 |
| 5,528,639 | A | * | 6/1996 | Eckert ..................... G21D 3/04 376/244 |
| 6,173,026 | B1 | | 1/2001 | Mowry et al. |
| 6,674,826 | B1 | | 1/2004 | McFetridge |
| 2004/0013220 | A1 | | 1/2004 | Casillas et al. |
| 2005/0117685 | A1 | * | 6/2005 | Casillas ................. G21D 3/001 376/260 |
| 2008/0152066 | A1 | | 6/2008 | Jacobs |
| 2012/0140864 | A1 | | 6/2012 | Farawila et al. |
| 2013/0266107 | A1 | | 10/2013 | Blaisdell et al. |
| 2021/0225538 | A1 | * | 7/2021 | Blaisdell ............... G21C 17/112 |

FOREIGN PATENT DOCUMENTS

| | | |
|---|---|---|
| JP | H08170998 A | 7/1996 |
| JP | 2001305269 A | 10/2001 |
| MX | 339578 B | 6/2016 |
| WO | 2013180806 A2 | 12/2013 |

OTHER PUBLICATIONS

GE. General Electric boiling water reactor maximum extended load line limit analysis plus. NEDO-33006. Aug. 2003. <https://www.nrc.gov/docs/ML0323/ML032340201.pdf>. (Year: 2003).*

Rotander, C., et al. "WEOD-S: Westinghouse expanded operating domain stability solution." (2014). (Year: 2014).*

Applicability of GE Methods to Expanded Operating Domains. Sep. 2010. GE Energy Nuclear. NEDO-33173-A Revision 1. See excerpts highlighted and the power flow map. (Year: 2010).*

International Search Report and Written Opinion for International PCT Application No. PCT/US2013/031116, dated Sep. 25, 2014.

Supplementary European Search Report for corresponding European Patent Application No. EP1379822.0, dated Sep. 25, 2015.

* cited by examiner

METHODS FOR PROTECTION OF NUCLEAR REACTORS FROM THERMAL HYDRAULIC/NEUTRONIC CORE INSTABILITY

CROSS-REFERENCE TO RELATED APPLICATIONS

This application is a continuation of U.S. application Ser. No. 13/798,418 filed on Mar. 13, 2013, which claims priority under 35 U.S.C. Section 119(e) from Provisional Application 61/611,618, entitled "Alternate Stability Solution for MELLA+" filed on Mar. 16, 2012, the entire contents of which are incorporated herein by reference.

FIELD OF THE INVENTION

The invention generally relates to methods for operating nuclear power reactors, such as boiling water reactors, to protect the reactors from thermal hydraulic/neutronic core instability in extended operating power flow conditions and, in particular, when an extended power uprate is implemented.

BACKGROUND

In general, boiling water reactors (BWRs) have a characteristic relation between core flow and power generation. For a fixed amount of control rod withdrawal from the core, constant rod lines (also called flow control lines and load lines, e.g., Maximum Extended Load Line Limit Analysis (MELLLA) and MELLLA+) can be established. Increasing the core flow slowly will increase the power along these constant rod lines by reducing voids in the moderator and its associated void reactivity feedback. Load line limits are established to satisfy various safety limits including fuel thermal limits.

As power uprates (e.g., up to 120% of the original licensed power) are implemented, load line limits are raised to realize increased power generation at a design (maximum) core flow limit. However, core thermal hydraulic stability is aggravated by power uprates and changes the power/flow operating map in a direction that causes a propensity to encounter instability at the upper left corner of the power/flow map (that is, high power/low core flow conditions), as shown in FIG. 1. The unstable operation of the reactor core can result in diverging neutron flux (and heat flux) generation due to resonance occurring between void reactivity feedback and heat flux generation which effects void creation. Diverging power oscillations can give rise to alternate dry-out and re-wetting of fuel cladding and eventually cause cladding failures. It is therefore highly desirable to avoid core operation in this region of the power/flow map (upper left corner).

The Boiling Water Reactor Owners' Group (BWROG) Long Term Stability Solutions are designed for the detection and suppression of instabilities that can compromise fuel integrity. There are different approaches which are suitable for various reactor types and sizes, depending on the specific plant stability properties. One widely applied approach is the Option III solution which, apart from administrative stability exclusion regions based on offline stability analysis, Backup Stability Protection (BSP), includes Oscillation Power Range Monitor (OPRM) hardware and software systems implementing three oscillation detection algorithms. The OPRM system uses groupings of the Local Power Range Monitor (LPRM) detector signals as input.

The Backup Stability Protection is a part of the Option III methodology, applied when the OPRM system isn't operable. It is based on stability calculations for the global, regional and thermal hydraulic oscillation modes. The "scram region" is the limit which represents the stability limit for the least stable mode. The "controlled entry region" is a limit set with appropriate margin to the "scram region".

As shown in FIG. 1, an OPRM system is "armed" (trip-enabled) in an operating domain defined by the region left and above points MFG, region 1. If the set point of the OPRM system is exceeded, indicating the presence of unstable (growing) power oscillations, an automatic scram or a selected rod insertion is initiated to suppress unstable operation before the oscillations have the potential to cause fuel damage. The set point of the OPRM system is determined by stability analysis prescribed by the delta Critical Power Ratio (CPR) over Initial Minimum CPR (IMCPR) versus Oscillation Magnitude (DIVOM) methodology. The DIVOM methodology relates the dry-out oscillation magnitude to the Hot Channel Oscillation Magnitude (HCOM). The set point of the OPRM system is then determined by a table where the HCOM is related to the OPRM oscillation amplitude. The limiting HCOM is determined from calculations at a natural circulation curve 3 (shown in FIG. 1) at the limiting burnup condition during the cycle. The calculations are performed for the regional oscillation mode, since this is limiting with regard to the relationship between dry-out and hot channel power oscillations.

The existence of unstable diverging power oscillations may challenge the Safety Limit Minimum Critical Power Ratio (SLMCPR). Power oscillations imply that the heat flux and coolant flow oscillate and subsequently, the MCPR. The DIVOM methodology establishes an OPRM set point that ensures that the SLMCPR is not violated due to the presence of growing oscillations resulting from anticipated instability events. As shown in FIG. 1, this option has been approved for operation up to a MELLLA control rod line 5 as defined by BC'.

When extended power uprates are implemented, it is highly desirable to allow operation above the MELLLA control rod line 5 up to a higher rod line 7 (shown in FIG. 1) designated MELLLA+ which is defined by DE'. The analysis state point for the DIVOM methodology, establishing the OPRM set point, is defined at the highest rod line at the natural circulation curve 3, or the state point reached after a double pump trip, that is, E' in FIG. 1.

Thus, as shown in FIG. 1, operation in a MELLLA+ domain 9, when the flow window is increased to the left at full power, means that a double pump trip from D will end at a higher power at the natural circulation curve 3 than for a MELLLA domain, that is, it will end at E' instead of C'. This state point (E') is less stable than the original (MELLLA) state point (C'), and individual fuel channels may be close to or exceed the thermal hydraulic stability limit. This could lead to chaotic or quickly diverging hot channel oscillations implying failure of the DIVOM methodology.

The DIVOM methodology calculates a relationship between dry-out oscillations and hot channel power oscillations for the limiting channels and therefore, if the thermal hydraulic stability deteriorates, small power oscillations can cause large channel flow oscillations and accordingly large dry-out oscillations. The DIVOM relationship becomes steeper, and the acceptable HCOM becomes smaller. Consequently, the set point to the OPRM system decreases. The set point for the OPRM system reflects the relative LPRM oscillation magnitude. If the set point is too low, the OPRM system may scram for oscillations which are in the range of the reactor noise level. However, if the set point is too high, the reactor may continue to operate during conditions of thermal hydraulic (channel) instability.

Another known stability solution Option 1-D uses the existing Reactor Protection System (RPS) to provide a sufficient automatic detect and suppress function. As shown in FIG. 1, a MCPR Safety Limit is protected by an APRM flow-biased trip 4 (without set down) for an anticipated core wide mode oscillation. Option 1-D plants have tight inlet orificing and small core size which makes the probability for regional oscillations occurring very low. The DIVOM methodology for this option is therefore based on global oscillations. The concerns regarding applicability of the DIVOM methodology for Option III are equally applicable to Option 1-D.

For Option 1-D, failure of the DIVOM methodology means that the thermal hydraulic instability occurs below the APRM flow-biased trip line 4. Thus, the DIVOM methodology is not adequately robust and therefore, is not applicable at the thermal hydraulic instability limit.

A known "Confirmation Density" solution has been proposed as a solution to this problem. Confirmation Density uses the OPRM hardware and implements a new algorithm to detect the onset of small amplitude power oscillations in local areas of the core. When a sufficient number of OPRM cells confirm the existence of oscillations that are typical of core instability, alarms and scram signals are generated and the reactor is scrammed (or SRI activated) before there is any risk for fuel damage due to the oscillations reaching large amplitudes. The implementation of this solution has disadvantages, however, including that it is complicated regarding both hardware and licensing, and the detection of oscillations at reactor noise levels can potentially lead to spurious scrams.

Another related known method to protect the core from unstable, uncoupled, thermal hydraulic/neutronic oscillations (so called density waves) has been proposed. This method is based on analyzing the LPRM detector signals for coupled (neutron/thermal hydraulic) behavior. If no coupled oscillations are detected, a calculation (on-line or off-line) is performed to examine if an analytically determined exclusion region is entered. This exclusion region defines the thermal hydraulic stability limit. The implementation of this method requires an on-line algorithm for determination of the risk for uncoupled density wave oscillations and further logics to connect to automatic, or manual, scram or other corrective actions.

Thus, there is a need in the art to develop a more reliable solution to prevent fuel cladding failures due to thermal hydraulic/neutronic core instability by preventing operation of the nuclear reactor in vulnerable regions of the power/flow map. Further, there is a need that the solution be relatively simple, operator friendly, easy to license and easy to implement (hardware and software).

SUMMARY OF THE INVENTION

In one aspect, the invention provides a method for protecting a nuclear reactor core from fuel damage due to thermal hydraulic instability in an extended operating domain. The method includes calculating a thermal hydraulic limit, identifying an unstable region of operation in a power/flow map, modifying the APRM-based trip system to set down the APRM flow-biased scram line when core flow is less than the predetermined core flow level, preventing the nuclear core from entering the unstable region of operation by causing a APRM scram or a selected rod insert when the set down APRM flow-biased scram line is exceeded, and identifying a predetermined core flow level.

The set point for the set down of the APRM flow-biased scram line can be determined by employing 3D core analyses of the thermal hydraulic stability limit.

The operation of the nuclear reactor can be conducted beyond a MELLLA rod control line to a MELLLA+ rod control line above the predetermined core flow level.

The existing OPRM instrumentation can be operable to detect and suppress global and local unstable operation in a MELLLA+ region.

The predetermined core flow level can be defined by the thermal hydraulic stability limit (can be 55% of rated core flow).

BRIEF DESCRIPTION OF THE DRAWINGS

A further understanding of the invention can be gained from the following description of the preferred embodiments when read in conjunction with the accompanying drawings in which.

DETAILED DESCRIPTION OF THE PREFERRED EMBODIMENTS

Figure 1:
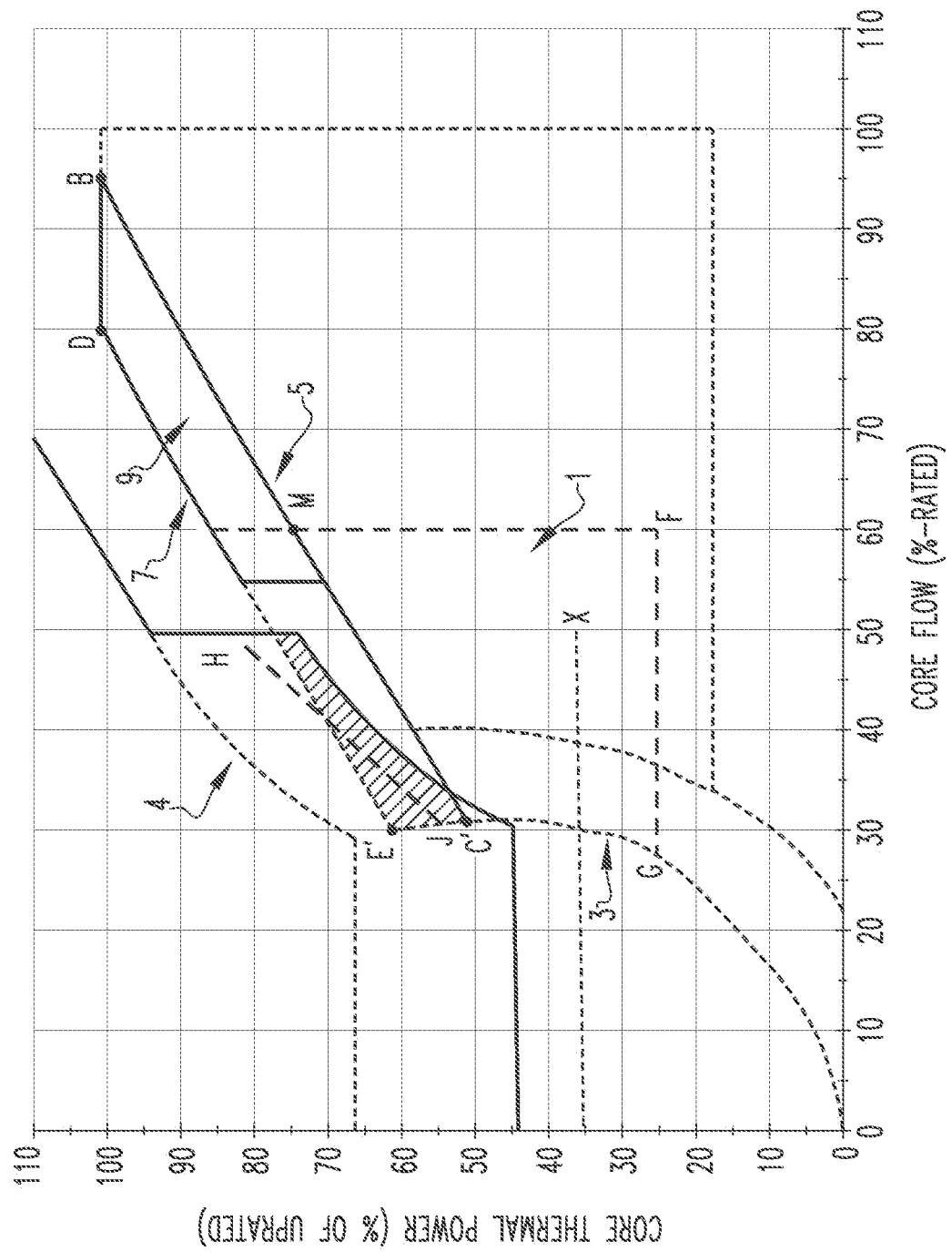
FIG. 1 shows a power/flow map wherein core thermal power is plotted against core flow and a corresponding APRM flow-biased trip without set down is identified, in accordance with the prior art (this option does not require a change in slope of the APRM trip lines)

The invention provides methods for protecting against fuel damage and fuel cladding failures in boiling water reactor (BWR) cores due to anticipated coupled thermal hydraulic/neutronic core instability. The invention includes global and regional modes, as well as thermal hydraulic instability in extended operating domains (EODs). This protection is highly desirable when the operating domain is extended as a result of Extended Power Uprates (EPUs) being implemented.

In certain embodiments, the invention includes a Westinghouse Stability Solution for BWRs operating in Expanded Operating Domains of Power/Core Flow regions (WEOD-S).

It is an object of the invention to employ existing licensed stability methodologies in an EOD. This is accomplished by introducing a set down of the APRM flow-biased scram line below a certain (e.g., preselected or predetermined) core flow set point or level. The set point for the APRM flow-biased scram line set down is determined by employing 3D core analysis of the thermal hydraulic stability limit. The method in accordance with the invention has one or more of the following features: (i) does not require oscillation confirmation, (ii) requires only simple or minor modification to the current hardware solution, and (iii) demonstrates design diversity when operating with OPRM.

Without intending to be bound by any particular theories, it is contemplated that the method of the invention anticipates coupled thermal hydraulic neutronic oscillations and, proactively and automatically prevents operation in the stability vulnerable regions of a power/flow map.

The invention introduces a restriction for operating the reactor core in the EOD region. In accordance with certain embodiments of the invention, operation in vulnerable regions of the power/flow map is prevented as follows. An Average Power Range Monitor (APRM)-based trip system is employed to provide anticipatory scram or power reduction. The APRM trip actuates when the core power increases and the core flow decreases. This is accomplished by setting down the APRM neutron flux flow-biased scram, so that the licensed stability methodology can still be applied within the domain bounded by the scram line. The basis for the amount of scram set down required is the establishment of the thermal hydraulic stability limit of the core. This solution precludes the use of complicated algorithms and new operator interfaces that are typically required in known solutions. Thus, it is anticipated that these features of the invention will contribute to an easier licensing process.

Existing methodology known in the art allows for nuclear power reactor operation in a particular region, i.e., up to a MELLLA control rod line. OPRM instrumentation is used to initiate associated alarms and automatic scram or select rod inserts to suppress unstable operation in this region for Option III plants. The APRM flow-biased scram protects the fuel integrity for Option 1-D plants. As a result of implementing extended power uprates, it is desired to operate beyond the MELLLA control rod line and up to a higher rod line, i.e., the MELLLA+ region. However, the existing methodology does not provide for adequate protection to suppress unstable operation expected in the low core flow regions of this extended domain. Thus, the methods of the invention provide for establishing a new predetermined level defined by thermal hydraulic stability limits for protected operation of the nuclear reactor core. The new predetermined level allows for operation beyond the MELLLA control rod line and into the MELLLA+ region. The existing OPRM instrumentation remains operable (in Option III plants) and applicable to detect and suppress unstable operation in this extended region by initiating associated alarms and automatic scram or select rod inserts.

It has been observed in analysis that the DIVOM methodology fails at the thermal hydraulic instability limit, either due to the steep DIVOM curve giving low OPRM set points or due to the chaotic behavior of the diverging oscillations (in situations when non-linear properties are prominent). The methods of the invention prevent reactor operation intruding into (intentionally or unintentionally) state points where the DIVOM methodology fails, i.e., becomes inapplicable. The methods of the invention anticipate and conservatively define a domain where the established and licensed DIVOM methodology and OPRM hardware are still applicable for operation beyond the MELLA control rod line. Such anticipatory trip signals to suppress oscillations are confirmed to be operationally acceptable and reduce or minimize the impact on plant availability due to low probability of transients and operator incursions into the exclusion region.

In accordance with the invention, the existing Option III OPRM-based solution is retained by restricting the operating domain to its area of applicability (that is, the DIVOM methodology applicability). The Option III OPRM-based solution is retained for most of the operating domain. For that region wherein the OPRM setpoint may not prevent fuel damage, the existing APRM based trip system is utilized to automatically prevent entry into the region where the DIVOM methodology is not applicable, that is, in the vicinity of the thermal hydraulic stability limit, by providing an anticipatory scram or power reduction function (thru selected rod insertion).

The existing flow-biased APRM-based trip system is minimally modified (e.g., set down) to provide an automatic anticipatory scram or selected rod insertion trip to realize a necessary power reduction function. This system actuates when core power is higher and core flow is lower than a predetermined set point or level defined by the thermal hydraulic stability limit that is based on advanced 3D core dynamic calculations.

Figure 2:
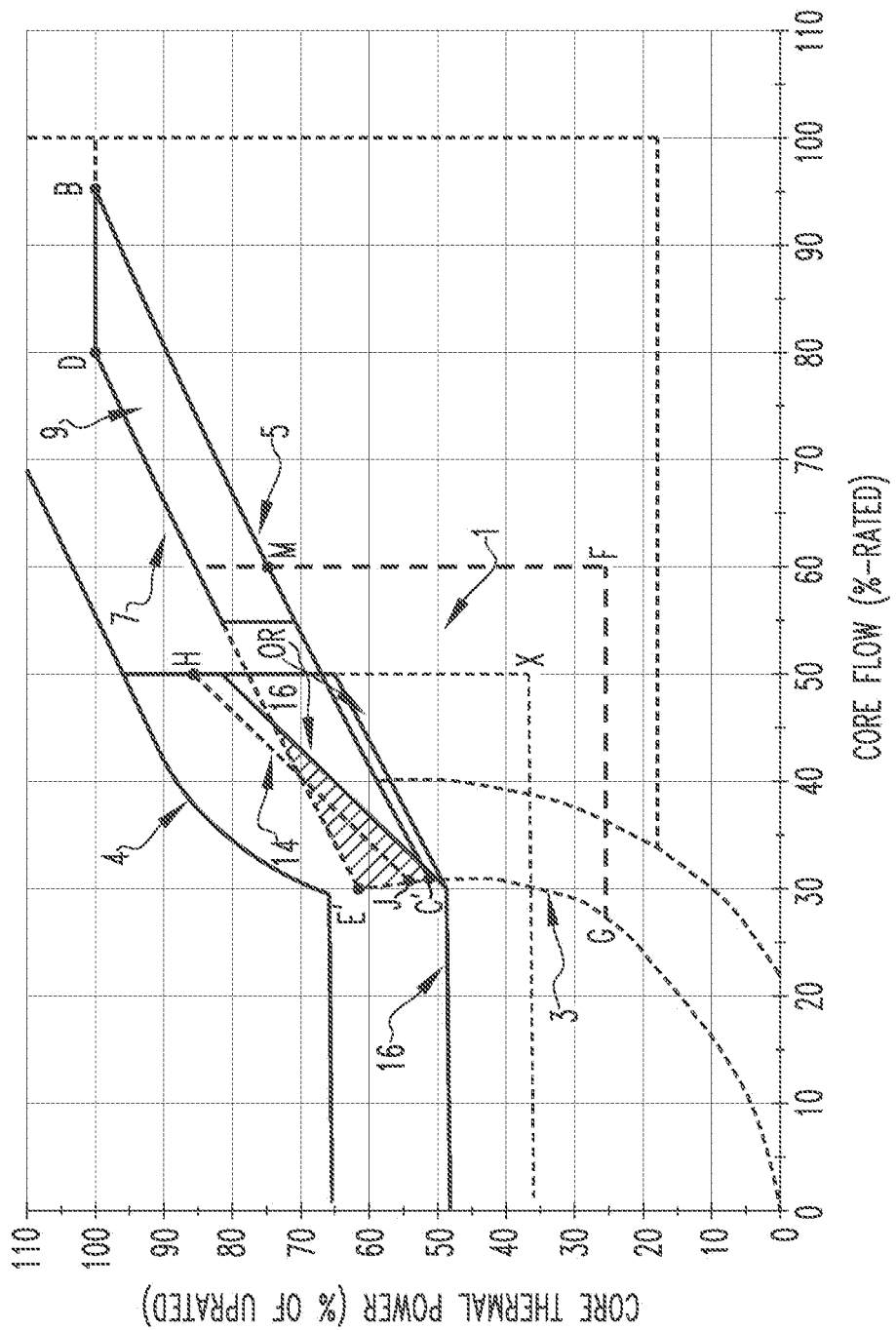
FIG. 2 shows a power/flow map wherein core thermal power is plotted against the core flow and a corresponding APRM flow-biased trip with set down is identified, in accordance with certain embodiments of the invention (this option involves both set down and a change in the slope of the APRM trip line below the core flow set point or level)

FIG. 2 is a power/flow map which shows a plot of the EOD alternate stability solution for APRM trip. FIG. 2 includes the region 1, the natural circulation curve 3, the APRM flow bias trip without setdown 4, the MELLLA control rod line 5, the higher rod line (MELLLA+) 7 and the MELLLA+ domain 9, as shown in FIG. 1. In addition, FIG. 2 includes a predetermined level X that is defined by a new thermal hydraulic stability limit 14 which is represented by HJ. This limit is determined by a thermal hydraulic code simulator. Suitable codes for use in the invention include those that are known in the art and commercially available, such as but not limited to POLCA-T. In general, plant-specific data is entered into the code for use in determining the thermal hydraulic stability limit. The data can include but is not limited to core design, depletion analysis characteristics of the core as a function of time from the beginning to the end of a cycle. The most bounding thermal limiting line is calculated at different flow rates to find the power level that reaches the thermal stability limit.

Investigations have shown that encountering local instabilities in the higher core flow region to the right of the scram trip line is highly unlikely. This anticipatory scram (or power reduction through selected rod insert) is initiated without depending on any operator action or detection of instability. Potential non-stable thermal hydraulic oscillations that could have occurred in the EOD are thereby avoided, and the regional and global oscillations can be reliably and readily suppressed prior to violating the SLMCPR.

Further, in FIG. 2, an APRM flow-biased scram trip set down 16 is based on analysis of the thermal hydraulic stability limit. That is, how much set down (from the original APRM flow-biased scram trip 4) is necessary to assure that the operation in an unstable region is blocked.

Figure 3:
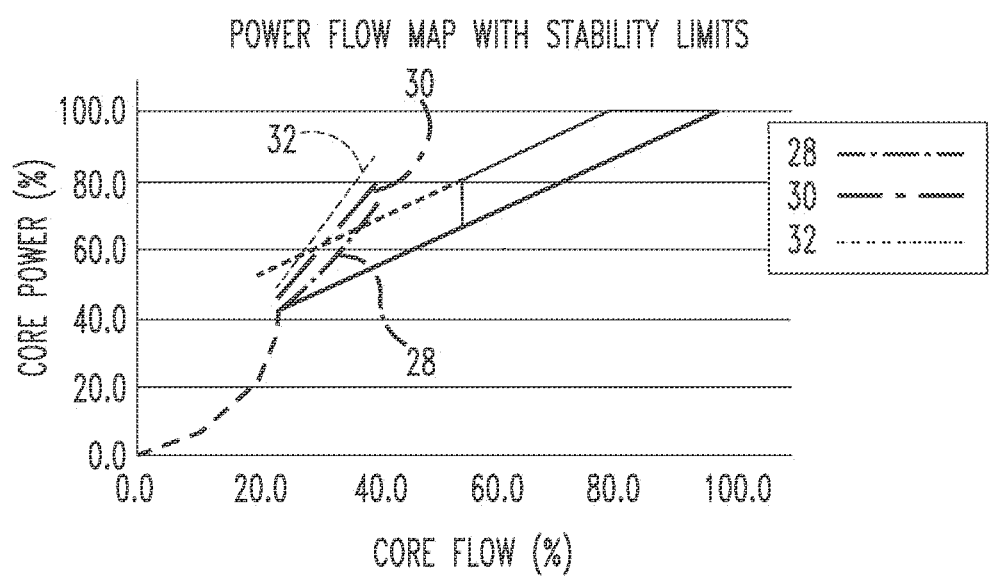
FIG. 3 shows a power/flow map with stability limits, in accordance with certain embodiments of the invention.

FIG. 3 is a power/flow map which shows a plot of an example of the global, regional, and thermal hydraulic stability limits. This represents typical results for the reactor stability properties initiated by the reactor dynamics: the core-wide (global) stability limit 28 is reached first. The regional instability limit 30 and the thermal hydraulic instability limit 32 follow, respectively. The stability limit lines are steeper than the rod line (constant reactivity). This characteristic allows the following approach to define the APRM flow-biased scram trip set down:

At natural circulation, or a state point (ST) determined by the intercept of two tangents of the APRM flow-biased scram line, the thermal hydraulic instability line is determined by a series of time domain analyses of state points with increasing power until instability is encountered;

Proper uncertainty methodology is applied to determine the thermal hydraulic instability state point as bounding on generic and plant-specific bases, and in certain embodiments, on a cycle-specific basis;

The fact that the rod line is always less steep than the thermal hydraulic instability line as a function of core flow is taken into account and therefore, the APRM flow-biased scram trip set down set point is defined as the difference between the thermal hydraulic instability power (including uncertainties) and the power at the highest rod line at natural circulation;

The right boundary, "X" (e.g., 55% flow in FIG. 1), is determined to be to the right of the extrapolated Backup Stability Protection "controlled entry" line; and The existing OPRM Option III and APRM flow-biased Option 1-D solutions that provide adequate protection when operating on or below the MELLLA line are retained. Option III is an already approved and licensed method which relies on OPRM detecting instability (regional or core wide) and alarming the operator when the operation ventures into the exclusion zone (MFG), and which eventually scrams the plant if the oscillation amplitudes become excessive. The APRM flow-bias scram set down based on the thermal hydraulic stability limit also retains the Option 1-D licensed methodology. In addition, when operating in the MELLLA+ region, for any flow decrease transient (initiated by operator, control malfunction, or pump trips), an automatic scram (or selected rod insert) is initiated before the flow decrease enters into the unstable region (as defined by the left side of the stability limit curve). This is accomplished by either of the below scram initiation functions by Neutron Monitoring System (NMS) instrumentation options:

1. When the core flow reduces below "X," the existing flow-biased APRM scram trips are automatically set down from their normal level by an amount that provides scram before the flow/power state enters into left side of stability limit line; or
2. A customized scram curve line that follows just to the right of the stability limit line is provided and armed whenever the flow is below "X" that would provide sufficient margin to the stability boundary limit (based on the BSP controlled entry line as described above).

The invention includes, but is not limited to, at least one of the following benefits. The approach of the invention considerably reduces licensing uncertainties for implementing MELLLA+ and greatly reduces/simplifies operator inputs and actions. The invention is much simpler to implement and operate while providing more robust and highly reliable protection against potential fuel cladding damage due to unstable core power oscillations. Further, the invention does not materially affect plant availability because an extremely low probability of entering into inadvertent operation in the stability vulnerable exclusion region and it reduces the likelihood of inadvertent scrams likely inherent with the known solutions.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed:

1. A method for protecting a nuclear reactor core from fuel damage due to thermal hydraulic instability in an extended operating domain for an extended power uprate, comprising:
   generating a power-flow operating map, comprising:
      establishing a natural circulation curve;
      establishing a Maximum Extended Load Line Limit Analysis (MELLLA) control rod line; and
      establishing a higher MELLLA+ control rod line positioned above the MELLLA control rod line;
      forming a MELLLA+ domain above the MELLLA control rod line, up to the higher MELLLA+ control rod line;
      identifying a predetermined core flow rate;
      calculating by a thermal hydraulic code simulator a thermal hydraulic stability limit for core flow rates less than or equal to the predetermined core flow rate;
      determining a power level that corresponds to the thermal hydraulic stability limit at different core flow rates that are less than or equal to the predetermined core flow rate;
      providing an Average Power Range Monitor (APRM) flow-biased scram line;
      lowering the APRM flow-biased scram line to below the thermal hydraulic stability limit based on the core flow rate being less than or equal to the predetermined core flow rate; and
   when operating in the MELLLA+ domain, actuating an APRM-based trip system based on a core flow decrease resulting from a flow decrease transient and power increases above the power level to provide an automatic anticipatory scram or a selected rod insertion trip to cause a power reduction.

2. The method of claim 1, wherein the predetermined core flow rate is 55% of rated core flow.

3. The method of claim 1, wherein lowering the APRM flow-biased scram line to below the thermal hydraulic stability limit comprises positioning the APRM flow-biased scram line below and lateral to the thermal hydraulic stability limit.

4. The method of claim 1, wherein the method further comprises employing Oscillation Power Range Monitor (OPRM) instruments for detecting power oscillations and thermal hydraulic instability, wherein upon exceeding an OPRM setpoint a scram signal is generated.

* * * * *